US012547112B2

(12) United States Patent
Toda et al.

(10) Patent No.: US 12,547,112 B2
(45) Date of Patent: Feb. 10, 2026

(54) IMAGE FORMING APPARATUS THAT FORMS ANTIBACTERIAL REGION ON RECORDING MATERIAL

(71) Applicant: CANON KABUSHIKI KAISHA, Tokyo (JP)

(72) Inventors: Atsushi Toda, Shizuoka (JP); Toru Oguma, Shizuoka (JP); Kazuhisa Shida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/909,811

(22) Filed: Oct. 8, 2024

(65) Prior Publication Data

US 2025/0028271 A1 Jan. 23, 2025

Related U.S. Application Data

(63) Continuation of application No. PCT/JP2023/003762, filed on Feb. 6, 2023.

(30) Foreign Application Priority Data

Apr. 11, 2022 (JP) ................................ 2022-065262

(51) Int. Cl.

| | |
|---|---|
| ***G03G 15/00*** | (2006.01) |
| ***G03G 9/08*** | (2006.01) |
| ***G03G 15/08*** | (2006.01) |

(52) U.S. Cl.

CPC ....... *G03G 15/5095* (2013.01); *G03G 9/0821* (2013.01); *G03G 15/0865* (2013.01)

(58) Field of Classification Search

CPC .......... G03G 15/0865; G03G 15/5095; G03G 9/0821

USPC .......................................................... 399/45

See application file for complete search history.

(56) References Cited

U.S. PATENT DOCUMENTS

2013/0071143 A1* 3/2013 Blanton .............. G03G 9/1355 399/223

FOREIGN PATENT DOCUMENTS

| | | | |
|---|---|---|---|
| CN | 111965962 | A | 11/2020 |
| JP | 2003241414 | A | 8/2003 |
| JP | 2008255522 | A | 10/2008 |
| JP | 2012002869 | A | 1/2012 |
| JP | 2016212396 | A | 12/2016 |
| JP | 6234345 | B2 | 11/2017 |
| JP | 2023010285 | A | 1/2023 |

* cited by examiner

*Primary Examiner* — Hoan H Tran

(74) *Attorney, Agent, or Firm* — Canon U.S.A., Inc. IP Division

(57) ABSTRACT

An image forming apparatus may include a holding container that holds a toner containing an antibacterial agent, and an image forming unit that forms an antibacterial region by applying the toner supplied from the holding container to a recording material by performing an image forming process. The antibacterial region is formed on a partial region that is a partial region of a first surface of the recording material and that is likely to be touched by a user's finger

20 Claims, 12 Drawing Sheets

FIG. 6

| | BALANCE OF ANTIBACTERIAL EFFECT AND COST | EASE OF HANDLING |
|---|---|---|
| CONFIGURATION I (ANTIBACTERIAL REGION IS DISPOSED ON PARTIAL REGION) | GOOD | NOT BAD |
| CONFIGURATION II (ANTIBACTERIAL REGION IS DISPOSED ON EDGE-PORTION REGION) | GOOD | NOT BAD |
| CONFIGURATION III (AREA OF BACK SURFACE ANTIBACTERIAL REGION IS LARGER THAN AREA OF FRONT SURFACE ANTIBACTERIAL REGION) | GOOD | GOOD |
| CONFIGURATION IV (AREA OF BACK SURFACE ANTIBACTERIAL REGION IS EQUAL TO AREA OF FRONT SURFACE ANTIBACTERIAL REGION) | GOOD | GOOD |
| COMPARATIVE EXAMPLE (ANTIBACTERIAL REGION IS DISPOSED OVER ENTIRE AREA OF ONE SIDE) | NOT GOOD | NOT BAD |

IMAGE FORMING APPARATUS THAT FORMS ANTIBACTERIAL REGION ON RECORDING MATERIAL

CROSS-REFERENCE TO RELATED APPLICATIONS

This application is a Continuation of International Patent Application No. PCT/JP2023/003762, filed Feb. 6, 2023, which claims the benefit of Japanese Patent Application No. 2022-065262, filed Apr. 11, 2022, both of which are hereby incorporated by reference herein in their entirety.

BACKGROUND OF THE INVENTION

Field of the Invention

The present invention relates to an image forming apparatus that forms an antibacterial region on a recording material.

Background Art

Printed materials (prescriptions and medical questionnaires) used in medical institutions, etc., are circulated among a plurality of people. Infection within a medical institution spreads as a result of a process being repeated in which infectious bacteria adhere to a printed material from the fingers of a given person's hand, and the bacteria then adhere to the fingers of another person's hand from the printed material. In view of this, an antibacterial agent having an antibacterial effect is included in a raw material (fibers, filler) for a printed material, or applied onto a printed material. According to Japanese Patent Laid-Open No. 6234345, a technique is proposed of applying an antibacterial agent to the entire area of one side of a printed material.

The technique of including an antibacterial agent in the entirety of a raw material for a printed material results in the antibacterial agent also being present in portions of the printed material that will not be touched by fingers of the hand. Thus, the antibacterial effect (antibacterial efficiency) obtained per amount of antibacterial agent used is low, leading to an increase in cost. In the case of the technique of applying an antibacterial agent to the entire area of one side of a printed material, one side of the printed material has an antibacterial effect but the other does not. A printed material is usually held by hand or between fingers. Thus, infection would spread via the other side, which does not have an antibacterial effect. Furthermore, the technique has resulted in an increase in cost because an antibacterial treatment is applied to the entire area of one side even though only a partial region of the printed material will be touched by fingers of the hand.

SUMMARY OF THE INVENTION

The present disclosure provides an image forming apparatus comprising a holding container that holds a toner containing an antibacterial agent, and an image forming unit that forms an antibacterial region by applying the toner supplied from the holding container to a recording material by performing an image forming process. The antibacterial region is formed on a partial region that is a partial region of a first surface of the recording material and that is likely to be touched by a user's finger.

Further features of the present invention will become apparent from the following description of exemplary embodiments with reference to the attached drawings.

BRIEF DESCRIPTION OF THE DRAWINGS

FIG. 6 is a diagram describing effects of an embodiment.

DESCRIPTION OF THE EMBODIMENTS

Figure 1:
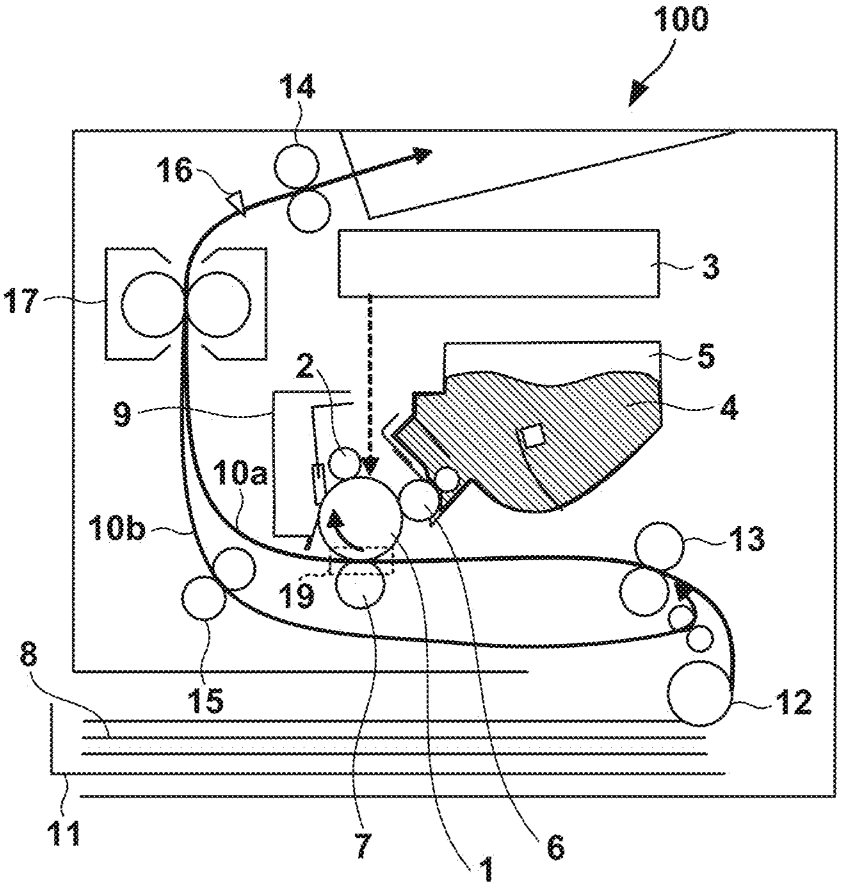
FIG. 1 is a diagram describing an image forming apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

(Image Forming Process)

FIG. 1 illustrates an image forming apparatus 100 of the electrophotographic method. A photosensitive drum 1 is an image carrier that includes an OPC photosensitive layer (organic photosemiconductor). The photosensitive drum 1 rotates in the direction of the arrow at a predetermined process speed. A charging roller 2 charges the surface of the charging roller 2 such that the electric potential on the surface of the photosensitive drum 1 equals a predetermined electric potential. A laser scanner 3 exposes the surface of the photosensitive drum 1 to light and forms an electrostatic latent image by outputting laser light in accordance with an image signal.

A developing container 5 accommodates an antibacterial toner 4 prepared by mixing an antibacterial agent into a toner. A developer carrying member 6 forms a toner image by developing the electrostatic latent image using the antibacterial toner 4.

The toner image is conveyed to a transfer unit 19 by the rotation of the photosensitive drum 1. The transfer unit 19 is formed by the photosensitive drum 1 and a transfer roller 7. A sheet cassette 11 is a storage compartment that stores many sheets of recording materials 8. A feed roller 12 feeds one sheet of recording material 8 from the sheet cassette 11 onto a conveyance path 10*a*. Conveyance rollers 13 convey the recording material 8 along the conveyance path 10*a* to the transfer unit 19.

The transfer unit 19 transfers the toner image from the photosensitive drum 1 onto the recording material 8. The antibacterial toner 4 remaining on the photosensitive drum 1 is recovered by a cleaning container 9. The photosensitive drum 1, the charging roller 2, the developing container 5, and the cleaning container 9 may be provided so as to be integrated and called a process cartridge.

The recording material 8 is conveyed from the transfer unit 19 to a fixing device 17. The fixing device 17 fixes the toner image onto the recording material 8 by applying heat and pressure to the toner image and the recording material 8. Discharge rollers 14 discharge the recording material 8 to the outside of the image forming apparatus 100. When double-sided printing is performed, the rotation direction of the discharge rollers 14 switches from the forward direction to the reverse direction when the rear end of the recording material 8 having an image formed on a first surface thereof is sensed by a sheet sensor 16. Thus, the recording material 8 is fed into a conveyance path 10*b* from the conveyance path 10*a* (switchback conveyance). Conveyance rollers 15 provided on the conveyance path 10*b* pass the recording material 8 to the conveyance rollers 13. The conveyance rollers 13 feed the recording material 8 to the transfer unit 19 once again. The transfer unit 19 transfers a toner image from the photosensitive drum 1 onto a second surface of the recording material 8. Subsequently, the recording material 8 is conveyed to the fixing device 17. The fixing device 17 fixes the toner image onto the second surface of the recording material 8. The discharge rollers 14 discharge the recording material 8 having undergone double-sided printing to the outside of the image forming apparatus 100.

Note that the antibacterial toner 4 is fixed onto the recording material 8 while heat and pressure are applied to the antibacterial toner 4 by the fixing device 17. Thus, a printed material formed from the recording material 8 and a toner image is subjected to an antibacterial treatment.

FIG. 1 illustrates an image forming apparatus 100 that forms monochrome images; however, the technical concept of the present invention is also applicable to an image forming apparatus that forms full-color images. Furthermore, the recording material 8 may be preprinted paper already having an image printed thereon.

(Antibacterial Agent)

As antibacterial agents, both inorganic antibacterial agents and organic antibacterial agents are applicable to the antibacterial toner 4. Note that inorganic antibacterial agents are superior to organic antibacterial agents in terms of heat resistance and stability.

Examples of inorganic antibacterial agents include metals, metal-compound-based antibacterial agents, oxide-photocatalyst-based antibacterial agents, etc. Examples of the metals include silver, copper, zinc, etc. Pure metals and/or antibacterial metal ions may be adopted. These metals may be carried by other inorganic substances. For example, examples of carriers for antibacterial metals include alumina, zeolite, silica gel, phosphate-based compounds, calcium carbonate, calcium silicate, silicate glass, etc.

For example, examples of oxide-photocatalyst-based antibacterial agents include anatase-type titanium oxides, etc. Charge separation occurs when an oxide-based photocatalyst is irradiated with light having a wavelength of 400 nm or shorter, for example, and electrons and holes are thus generated. The holes react with water vapor and oxygen in the air and generate reactive oxygen species such as OH radicals. Microorganisms can be eliminated by the powerful oxidation capability thereof.

Among the above-described antibacterial agents, silver-based antibacterial agents particularly have a broad antibacterial spectrum and high antibacterial activity. Two or more types of antibacterial agents may be used together, as necessary, for the antibacterial toner 4.

(Toner)

The toner used in the present embodiment includes an external additive and toner particles containing a binder resin such as a styrene-based copolymer resin, a polyester resin, or the like. Furthermore, a known releasing agent (wax) may be used in the toner particles in order to impart releasability to the toner, and a known charge control agent may be further used. The toner used in the present embodiment may be a magnetic single-component toner, a non-magnetic single-component toner, or a non-magnetic two-component toner. Furthermore, the method for producing the toner is not particularly limited, and the pulverization method, the suspension polymerization method, the emulsion aggregation method, etc., could be adopted.

(Antibacterial Pattern)

The image forming apparatus 100 functions as a document-image forming unit that forms a document image, and also functions as an antibacterial-pattern forming unit that forms an antibacterial pattern image that exhibits an antibacterial effect. Thus, in a case in which blank paper is used as the recording material 8, both the formation of a document image and the formation of an antibacterial region are executed. In a case in which preprinted paper is used as the recording material 8, the image forming apparatus 100 can form an antibacterial region on the preprinted paper.

An antibacterial pattern is an image pattern that is printed using the antibacterial toner 4 so as to have an antibacterial property. For example, examples of the antibacterial pattern include a solid image, a halftone image, and deliberately induced fogging. Fogging is a toner image that adheres to the photosensitive drum 1 irrespective of the image signal and ends up being transferred to the recording material 8 by temporarily changing the relationship between a charging voltage applied to the charging roller 2 and a developing voltage applied to the developer carrying member 6. Thus, fogging is generated even if the laser scanner 3 does not emit laser light.

From the viewpoint of maintaining document-image quality and the viewpoint of reducing antibacterial cost, a solid image would seldom be used. The antibacterial pattern is formed so that an antibacterial property of a sufficient level is ensured and so as to have a density such that the antibacterial pattern is difficult to see with human eyes. Accordingly, a low-density halftone image or fogging controlled to have low density would be used in most cases as the antibacterial pattern.

(Antibacterial Region)

In the present embodiment, a surface region which is included in the surface region of a printed document and in which an antibacterial pattern having an antibacterial effect is formed is called an antibacterial region. The region to which antibacterial printing is applied does not need to be the entire area of the recording material 8, and may be limited to a region (easy-to-touch region) that will be touched by many people. Thus, the antibacterial printing need not be applied to a region (difficult-to-touch region) that will seldom be touched by people. That is, the antibacterial printing is applied only to a partial region of the first surface or the second surface of the recording material 8. Thus, the suppression of infection and a reduction in cost can be balanced. Conventionally, no specific invention has been proposed for balancing the prevention of infection and low cost under such a concept. Specifically, if antibacterial printing were to be applied to the entire area of both sides of the recording material 8, the cost will increase because a large amount of the antibacterial toner 4 would be used. In order to further enhance the antibacterial effect, an antibacterial region may be disposed on an appropriate surface region of the first surface or the second surface of the recording material 8.

In view of this, in the present embodiment, specific antibacterial regions (configurations I to IV) for balancing the antibacterial effect and a reduction in cost are proposed.

Configuration I: An antibacterial region is disposed on part of the recording material 8.

Configuration II: An antibacterial region is disposed on the edge portion of the recording material 8.

Configuration III: The area of an antibacterial region disposed on the front surface of the recording material 8 is smaller than the area of an antibacterial region disposed on the back surface of the recording material 8, but the antibacterial region on the front surface and the antibacterial region on the back surface overlap when seen from the thickness direction of the recording material 8.

Configuration IV: The area of an antibacterial region on the front surface and the area of an antibacterial region disposed on the back surface are equal, but the antibacterial region on the front surface and the antibacterial region on the back surface overlap when seen from the thickness direction of the recording material 8.

(1) Details of Configuration I

By applying an antibacterial region to part of the recording material 8 as described above, the amount of antibacterial toner 4 used is reduced and lower cost is achieved compared to a method in which the entire area is antibacterially treated. Thus, a reduction in cost and a strong antibacterial effect are achieved. By disposing an antibacterial region only on a partial region that is likely to be touched by people, antibacterial performance would be exhibited even more efficiently.

FIGS. 2A to 2J each illustrate a specific example in which an antibacterial region 200 is provided only on part of the recording material 8. Note that hatching is applied to the antibacterial region 200. Here, the antibacterial region 200 is provided only on the front-surface side of the recording material 8. The antibacterial region 200 is a surface region of the recording material 8 that many people will touch by hand. On the other hand, the white background portion indicates a non-antibacterial region 201 in which the necessity of the antibacterial treatment is low. The non-antibacterial region 201 is a surface region of the front surface of the recording material 8 that is unlikely to be touched by people by hand, empirically or experimentally. FIGS. 2F to 2J respectively correspond to FIGS. 2A to 2E, and each indicate a product example (application example) of the recording material 8.

Figure 2A:
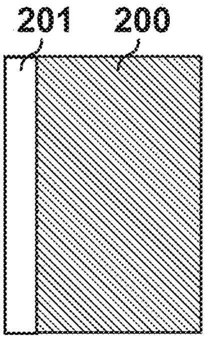
FIG. 2A is a diagram illustrating an antibacterial region relating to configuration I.
Figure 2B:
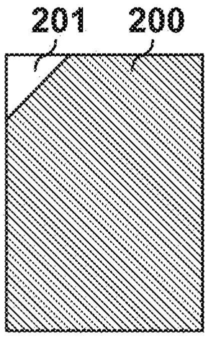
FIG. 2B is a diagram illustrating an antibacterial region relating to configuration I.
Figure 2C:
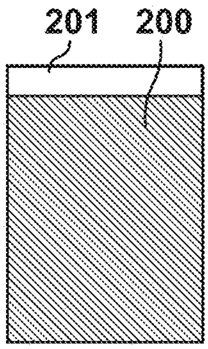
FIG. 2C is a diagram illustrating an antibacterial region relating to configuration I.
Figure 2D:
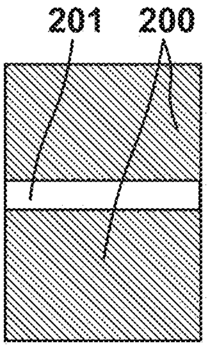
FIG. 2D is a diagram illustrating an antibacterial region relating to configuration I.
Figure 2E:
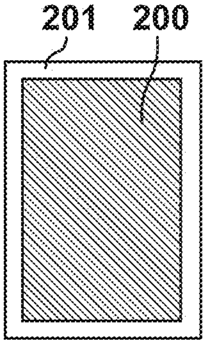
FIG. 2E is a diagram illustrating an antibacterial region relating to configuration I.
Figure 2F:
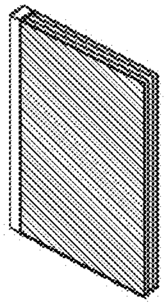
FIG. 2F is a diagram illustrating an antibacterial region relating to configuration I.

In FIGS. 2A and 2F, an assumption is made that the recording material 8 will be filed into a booklet or a binder. A surface region that is likely to be touched by hand, excluding a punch hole, a glue margin, or a binding margin, is secured as the antibacterial region 200. In this example, the width of the non-antibacterial region 201 corresponds to the width of a binding-margin region that will become a punch hole, a glue margin, or a binding margin, and is several millimeters. That is, the width of the antibacterial region 200 is the difference between the width of the recording material 8 and the width of the binding-margin region. As illustrated in FIG. 2F, the antibacterial treatment is applied focusing only on a surface region that is likely to be touched by hand in the recording material 8 in the filed state.

Figure 2G:
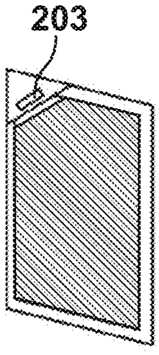
FIG. 2G is a diagram illustrating an antibacterial region relating to configuration I.

In FIGS. 2B and 2G, an assumption is made that multiple sheets of the recording material 8 will be filed by a staple 203 being applied to the top left corner of the recording material 8. The surface region excluding the triangular non-antibacterial region 201 disposed near the top left corner is secured as the antibacterial region 200. The width of the non-antibacterial region 201 (the height of a right isosceles triangle; the distance from the top left corner of the recording material 8 to the opposing side) is approximately several millimeters.

Figure 2H:
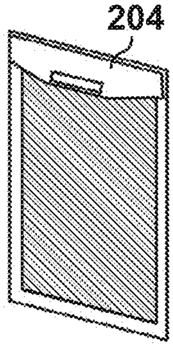
FIG. 2H is a diagram illustrating an antibacterial region relating to configuration I.

In FIGS. 2C and 2H, an assumption is made that the recording material 8 will be filed in a binder 204 that binds the top portion of the recording material 8. The top portion of the recording material 8 is a filing region, and is unlikely to be touched by people because the portion will be concealed by the binder 204. Thus, the non-antibacterial region 201 is disposed at the top portion of the recording material 8. The width of the non-antibacterial region 201 (the length of the non-antibacterial region 201 from the top edge of the recording material 8 in the direction from the top edge to the bottom edge) is several millimeters. In this example, because the non-antibacterial region 201 has the shape of a rectangle (horizontal band), the short edges of the non-antibacterial region 201 are several millimeters long. The antibacterial region 200 extends to the bottom edge of the recording material 8 from a position that is several millimeters away from the top edge of the recording material 8. The antibacterial region 200 is also rectangular.

Figure 2I:
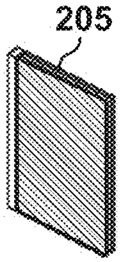
FIG. 2I is a diagram illustrating an antibacterial region relating to configuration I.

In FIGS. 2D and 2I, an assumption is made that the recording material 8 will be folded in two at the center to create a booklet 205 that is smaller in size than the original recording material 8. The non-antibacterial region 201 is secured in a central horizontal band portion that becomes a binding margin or a spine. The antibacterial region 200 is secured on both sides of the non-antibacterial region 201. Because the non-antibacterial region 201 has the shape of a rectangle (horizontal band), the short edges of the non-antibacterial region 201 are several millimeters long. The surface region of the front surface of the recording material 8 excluding the non-antibacterial region 201 is the antibacterial region 200.

Figure 2J:
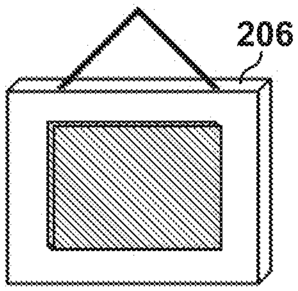
FIG. 2J is a diagram illustrating an antibacterial region relating to configuration I.

FIGS. 2E and 2J illustrate an example in which the recording material 8 is to be accommodated in a picture frame 206 or the like. The non-antibacterial region 201 is secured in a margin portion of the front surface of the recording material 8 that will be concealed by the inner frame of the picture frame 206. The antibacterial region 200 is secured in an exposed region of the front surface of the recording material 8 that will not be concealed by the inner frame of the picture frame 206. In this example, the non-antibacterial region 201 has the shape of a frame, and the width of the frame is no more than the width of the inner frame of the picture frame 206 and is several millimeters.

In such a manner, in each of the above examples, the antibacterial region 200 is secured in a surface region that is likely to be touched by hand and that needs to be antibacterially treated. Thus, antibacterial performance and a reduction in cost can be balanced. Furthermore, the above-described antibacterial regions 200 are mere examples. The present embodiment is applicable to any product in which a surface region in which the necessity of antibacterial treatment is high and a surface region in which the necessity of antibacterial treatment is low are distinct. In other words, it is sufficient that the antibacterial region 200 be disposed in a surface region in which the necessity of antibacterial treatment is high, and the non-antibacterial region 201 be disposed in other surface regions in which the necessity of antibacterial treatment is low.

(2) Details of Configuration II

The antibacterially treated area can be reduced by disposing the antibacterial region 200 on edge-portion regions of the recording material 8. Furthermore, the effective antibacterial performance would be enhanced because edge-portion regions of the recording material 8 are likely to be touched by human hand.

The reason why it has become necessary to antibacterially treat the edge portion of the recording material 8 will be described. In recent years, shielding plates are installed at government-office service counters and corporate conference rooms as a measure for preventing the spread of COVID-19. In the bottom part of a shielding plate, an approximately 10 cm-high space through which the recording material 8 can be handed over is provided. Furthermore, social distance needs to be secured. Under such circumstances, there has been an increase in cases in which the recording material 8 is received and handed over by stretching hands. Furthermore, when the recording material 8 is to be passed between two people who are separated from one another by a distance allowing the two to barely reach one another, the edge portion of the recording material 8, rather than the center portion thereof, would be held. Accordingly, the edge portion of the recording material 8 is touched more frequently by hand than the center portion. In view of this, it would be sufficient to apply the antibacterial treatment only to an edge-portion region (area extending to a distance of several centimeters from one or more edges of the recording material 8). Furthermore, the necessity would be low of antibacterially treating the center region, which is seldom touched. Thus, the antibacterial effect and a reduction in cost would be balanced.

FIGS. 3A to 3H each illustrate an example of a non-antibacterial region 201 and an antibacterial region 200 disposed on an edge-portion region of the recording material 8. Note that, here, an assumption is made the antibacterial region 200 is provided only on the first-surface (front-surface) side of the recording material 8. FIGS. 3A to 3D each illustrate the recording material 8. FIGS. 3E to 3H each illustrate an example of a printed product.

Figure 3A:
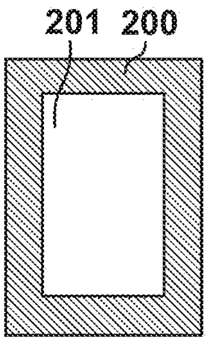
FIG. 3A is a diagram illustrating an antibacterial region relating to configuration II.
Figure 3B:
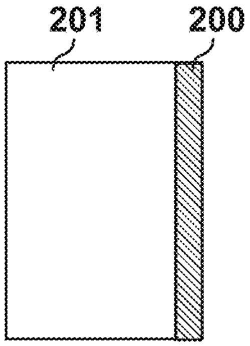
FIG. 3B is a diagram illustrating an antibacterial region relating to configuration II.
Figure 3C:
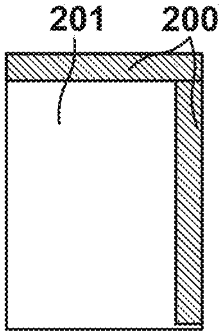
FIG. 3C is a diagram illustrating an antibacterial region relating to configuration II.
Figure 3D:
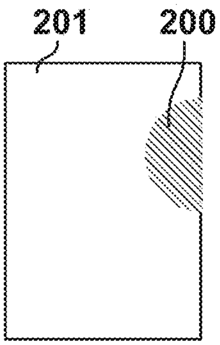
FIG. 3D is a diagram illustrating an antibacterial region relating to configuration II.
Figure 3E:
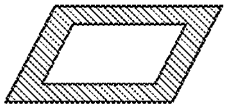
FIG. 3E is a diagram illustrating an antibacterial region relating to configuration II.

The recording material 8 illustrated in FIGS. 3A and 3E is to be handed over and received through an opening in a shielding plate installed at a service counter, or to be handed over and received over a table in a conference room in which a plurality of people are seated with a relatively large space therebetween. In this case, an assumption can be made of a situation in which one person holds an edge-portion region on the side of one edge of the recording material 8, and the other person holds an edge-portion region on the side of the opposing edge of the recording material 8. Accordingly, a frame-shaped antibacterial region 200 is formed along the four edges of the recording material 8. The width of the antibacterial region 200 (width of the frame shape) is several centimeters. That is, a surface region extending to a distance of several centimeters from each edge of the recording material 8 is the antibacterial region 200. The center region of the recording material 8 is the non-antibacterial region 201. That is, a surface region separated by a distance of more than several centimeters from each edge of the recording material 8 is the non-antibacterial region 201. In such a manner, the antibacterial region 200 is disposed on a surface region that is likely to be touched by people, and the non-antibacterial region 201 is disposed on a surface region that is unlikely to be touched by people. Thus, the antibacterial effect and a reduction in cost can be balanced.

Figure 3F:
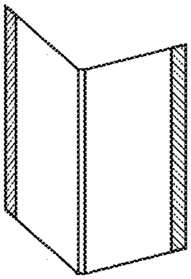
FIG. 3F is a diagram illustrating an antibacterial region relating to configuration II.

In FIGS. 3B and 3F, an assumption is made that multiple sheets of the recording material 8 will be filed into a booklet or a binder. The antibacterial region 200 is disposed on a surface region that is likely to be touched by hand, excluding a punch hole, a glue margin, or a binding margin. However, in a case in which sheets of the recording material 8 with thickness are to be bound into a book, fore-edge-side edge-portion regions of the front cover and the recording material 8 bound behind the front cover would be actually touched by hand. As illustrated in FIGS. 3B and 3F, the antibacterial region 200 is disposed on an area extending to a distance of several centimeters from one edge that becomes the fore edge of the recording material 8.

Figure 3G:
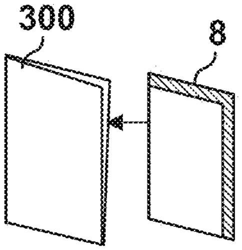
FIG. 3G is a diagram illustrating an antibacterial region relating to configuration II.

FIGS. 3C and 3G illustrate an action of filing the recording material 8 into a clear file (paper folder) 300, two edges of which are sealed. Usually, the clear file 300 is fabricated by bonding two edges of two light-transmitting resin films. In this case, the recording material 8 is inserted and removed from the two unsealed edges (top portion and side portion) among the four edges of the clear file 300. Accordingly, the antibacterial region 200 is disposed on an edge-portion region close to the two corresponding edges of the recording material 8. In this example, the antibacterial region 200 has an L shape (inverted L shape). The width of the antibacterial region 200 is several millimeters. That is, the antibacterial region 200 is disposed on a surface region extending to a distance of several millimeters from the top edge of the recording material 8 and a surface region extending to a distance of several millimeters from the right edge of the recording material 8. The non-antibacterial region 201 is disposed on the surface region of the recording material 8 excluding the antibacterial region 200.

While two edges of the clear file 300 are sealed here, the number of sealed edges may be one or three. Furthermore, some of the four edges of the clear file 300 may be locally sealed to an extent such that the sides do not interfere with the insertion and removal of the recording material 8. In this case as well, the antibacterial region 200 is disposed on an edge-portion region of the recording material 8 that corresponds to the open portion of the four edges of the clear file 300. In such a manner, only an edge-portion region that will be touched by hand upon filing and removing the recording material 8 is antibacterially treated. Furthermore, the non-antibacterial region 201 is disposed on a surface region that is seldom touched. The antibacterial effect and a reduction in cost may be balanced in such a manner.

Figure 3H:
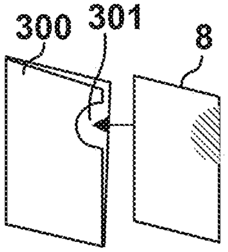
FIG. 3H is a diagram illustrating an antibacterial region relating to configuration II.

FIGS. 3D and 3H illustrate a state in which the recording material 8 is being placed in a clear file 300 having a crescent-shaped opening 301. In this case, a crescent-shaped antibacterial region 200 is disposed on the recording material 8 so as to match the opening 301. That is, the shape and position of the antibacterial region 200 are aligned with the shape and position of the opening 301. However, the shapes do not necessarily have to match. For example, it is sufficient that the antibacterial region 200 be larger than the opening 301. For example, it would be sufficient if the radius of the semi-circle constituting the antibacterial region 200 is larger by about several millimeters than the radius of the semi-circle constituting the opening 301. Note that the opening 301 may be called a cutout.

By providing the antibacterial region 200 only on an edge-portion region that will be frequently touched by hand in such a manner, antibacterial performance and cost can be efficiently balanced. Furthermore, the above-described antibacterial regions 200 are mere examples. The present embodiment is applicable to any product in which an edge-portion region in which the necessity of antibacterial treatment is high and other regions in which the necessity of antibacterial treatment is low are distinct. In other words, it is sufficient that the antibacterial region 200 be disposed in an edge-portion region in which the necessity of antibacterial treatment is high, and the non-antibacterial region 201 be disposed in other surface regions in which the necessity of antibacterial treatment is low.

(3) Details of Configuration III

FIGS. 4A to 4E illustrate configuration III. The white arrows indicate the conveyance direction of the recording material 8. In configuration III, the area of an antibacterial region 200 provided on a front surface P1 of the recording material 8 is smaller than the area of an antibacterial region 200 provided on a back surface P2 of the recording material 8. Furthermore, the position of the antibacterial region 200 on the back surface P2 is aligned (overlaps) with the position of the antibacterial region 200 on the front surface P1.

For example, there are cases in which no image is printed on the back surface P2 of the recording material 8 while an image is printed on the front surface P1, and a user views the recording material 8 while holding the recording material 8 by hand. In this case, the antibacterial effect and a reduction in cost can be balanced by providing the antibacterial region 200 on both the front surface P1 and the back surface P2 of the recording material 8. In such a case, conventionally, the entire area of the front surface P1 and the entire area of the back surface P2 were subjected to the antibacterial treatment. In configuration III, the amount of antibacterial toner 4 used is reduced while the antibacterial effect is maintained because the antibacterial treatment is applied focusing on surface regions that will be touched by hand. That is, the antibacterial effect and a reduction in cost can be balanced.

Figure 4A:
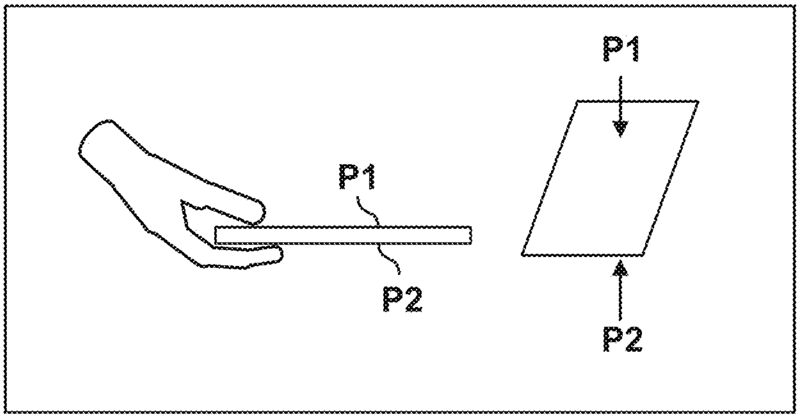
FIG. 4A is a diagram illustrating antibacterial regions relating to configuration III.

As illustrated in FIG. 4A, the recording material 8 is an object with weight. Thus, a user would hold the recording material 8 while touching a relatively large area of the back surface P2, which is affected by gravity, and also touching the front surface P1, which supports the back surface P2. Thus, when looking through the recording material 8 from the front surface P1 toward the back surface P2, at least the antibacterial region 200 on the front surface P1 overlaps the antibacterial region 200 on the back surface P2, and the area of the antibacterial region 200 on the back surface P2 is larger than the area of the antibacterial region 200 on the front surface P1.

Incidentally, in order to realize such an antibacterial state using the image forming apparatus 100, the back surface P2 is printed after the front surface P1 has been printed in the image forming process. In doing so, the recording material 8 is fed into the transfer unit 19 once again through the conveyance paths 10 by switchback conveyance. As a result of the conveyance direction of the recording material 8 being reversed by switchback conveyance, the surface facing the photosensitive drum 1 switches from the front surface P1 to the back surface P2. Furthermore, the short edge that enters the photosensitive drum 1 earlier among the two short edges of the recording material 8 also switches. Thus, with respect to the conveyance direction of the recording material 8, the position of the antibacterial region 200 on the back surface P2 is vertically symmetric to the position of the antibacterial region 200 on the front surface P1. Thus, the antibacterial region 200 on the front surface P1 and the antibacterial region 200 on the back surface P2 are provided on the side of the same short edge of the recording material 8.

The specific dimensions to be described in relation to FIGS. 4A to 4E are mere examples. The dimensions may be adjusted in accordance with the age or physical build of a user, user needs, and the size and shape of the recording material 8. Thus, numerical values such as the areas and widths w of the antibacterial regions 200 are mere examples.

Figure 4B:
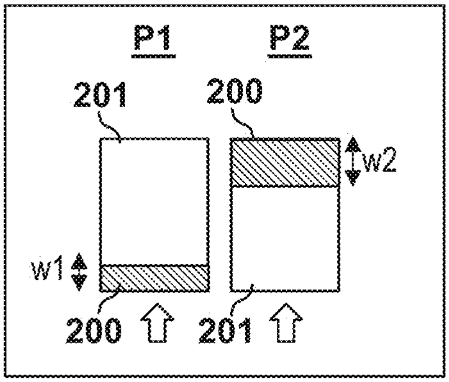
FIG. 4B is a diagram illustrating antibacterial regions relating to configuration III.

In FIG. 4B, an assumption is made that a user will hold the bottom-edge side of the recording material 8. The antibacterial region 200 on the front surface P1 is provided on the bottom edge side as a horizontal black band having a width w1. The antibacterial region 200 on the back surface P2 is provided on the top edge side, which is a vertically symmetric position with respect to the front surface P1, as a horizontal black band having a width w2. The width w2 is wider than the width w1.

The areas and the widths w of the bands may be calculated with reference to the dimensions of the palm of an ordinary adult user working in the medical field or at a service counter at a government office or the like. As one example, an assumption is made that the recording material 8 is of the A4 size to the A3 size. As assumption is made that the thumb will hold the front surface P1, and the other four fingers will support the back surface P2. From the dimensions of the hand and the state in which the recording material 8 will be held, the width w1 and the width w2 of the antibacterial regions 200 are calculated as approximately 60 mm and approximately 100 mm, respectively. The width w1 is substantially close to the distance from the base of the thumb or the index finger to the tip of the thumb. The width w2 is close to the distance from the base of the thumb or the index finger to the tip of a finger other than the thumb.

Figure 4C:
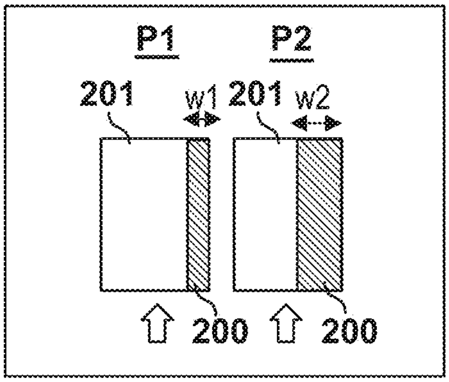
FIG. 4C is a diagram illustrating antibacterial regions relating to configuration III.

In FIG. 4C, an assumption is made that one side (right side) of the recording material 8 will be held by hand. The antibacterial region 200 on the front surface P1 is provided as a vertical black band having a width w1 extending along the right edge of the recording material 8. The antibacterial region 200 on the back surface P2 is provided as a vertical black band having a width w2 extending along the right edge of the recording material 8. In this case as well, the width w2 is wider than the width w1. Note that, if the long edges of the antibacterial regions 200 are parallel to the conveyance direction of the recording material 8, the same long edge among the two long edges of the recording material 8 would be the right edge even if the recording material 8 is reversed for double-sided printing. Thus, on the front surface P1 and the back surface P2, an antibacterial region 200 is provided on the side of the same long edge. The method for determining the widths and dimensions of the antibacterial regions 200 in FIG. 4C is the same as the method for determining the widths and dimensions of the antibacterial regions 200 in FIG. 4B. Thus, the width w1 and the width w2 are determined as approximately 60 mm and approximately 100 mm, respectively.

Figure 4D:
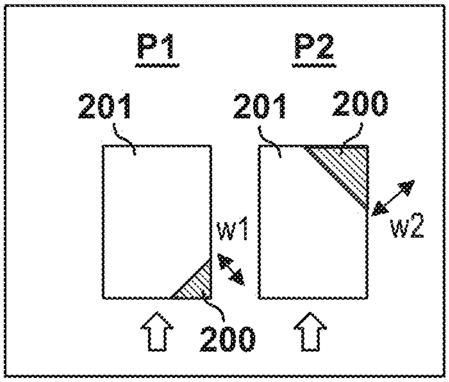
FIG. 4D is a diagram illustrating antibacterial regions relating to configuration III.

In FIG. 4D, an assumption is made that one of the four corners of the recording material 8 will be held by a user. The antibacterial region 200 on the front surface P1 is provided on the bottom right corner of the recording material 8, and is triangular. The antibacterial region 200 on the back surface P2 is provided at a position that is vertically symmetric with respect to the antibacterial region 200 on the front surface P1. That is, the antibacterial region 200 is disposed on the top right corner. The antibacterial region 200 on the back surface P2 is triangular, but has a larger area. In this example, the height of the triangle on the front surface P1 is defined as a width w1, and the height of the triangle on the back surface P2 is defined as a width w2. Here, a height is the distance from a vertex of an isosceles triangle forming a right angle to the opposing side. Note that the reason behind the positions of the antibacterial region 200 on the front surface P1 and the antibacterial region 200 on the back surface P2 is as already described in relation to FIGS. 4B and 4C. Furthermore, the method for calculating the width w1 and the width w2 is also the same, but the width w1 and the width w2 extend along the direction of fingers. Accordingly, the width w1 and the width w2 are calculated as approximately 60 mm and approximately 100 mm, respectively.

Figure 4E:
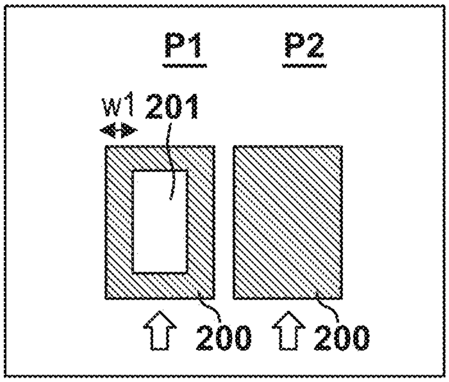
FIG. 4E is a diagram illustrating antibacterial regions relating to configuration III.

In FIG. 4E, an assumption is made of a situation in which a user hands the recording material 8 to someone else while holding the recording material 8 by hand, and a situation in which the recording material 8 is handled in a state in which the recording material 8 is turned over with the printed side down. Recording materials 8 on which examination questions are printed would be placed on a desk with the printed side down. Recording materials 8 on which confidential information is printed would also be placed on a desk with the printed side down. The recording materials 8 would be flipped over to view the printed side. An image forming apparatus 100 having the so-called face-down discharge function discharges recording materials 8 with the printed side facing downward. On the front surface P1 of such a recording material 8, a black band-shaped antibacterial region 200 on the outer peripheral portion of the recording material 8 is disposed. An antibacterial region 200 is disposed over the entire area of the back surface P2 of the recording material 8. The antibacterial region 200 on the front surface P1 and the antibacterial region 200 on the back surface P2 both have vertically symmetric shapes. Thus, there is no need to change the position of the antibacterial region 200 between the front surface P1 and the back surface P2. The antibacterial region 200 on the front surface P1 has the shape of a frame, and a width w1 of the frame is calculated as approximately 100 mm. The basic idea underlying the calculation method is as already described in relation to FIGS. 4B to 4D.

The antibacterial regions 200 illustrated in FIG. 4E cover a relatively large area, and the benefit thereof in terms of cost would thus be small. However, because a non-antibacterial region 201 is secured on the front-surface-P1 side, the amount of the antibacterial toner 4 used is reduced and thus there is a benefit in terms of cost. Furthermore, an antibacterial region 200 is also secured on the back surface P2, which cannot be seen from a user when the recording material 8 is turned over with the printed side down, while an antibacterial region 200 is secured on the front surface P1, which can be seen from the user in the same situation. Because antibacterial regions 200 are disposed on regions that are likely to be touched by a user in such a manner, the user can safely handle the recording material 8 without worrying about the location of the recording material 8 that the user touches. Furthermore, the versatility in handling the recording material 8 would improve, and a reduction in cost would also be achieved.

There are cases in which the recording material 8 is folded in two and handed over from one user to another. For example, if the printed side is on the front surface P1, the recording material 8 would be folded in two such that the back surface P2 is on the outer side and the front surface P1 is on the inner side. That is, because an antibacterial region 200 is disposed over the entire area of the back surface P2, which would be touched by hand when the recording material 8 is passed between users, users can safely handle the recording material 8 without worrying about the location of the recording material 8 that the users touch. Accordingly, the versatility in handling the recording material 8 would increase, and low cost would also be achieved.

In such a manner, in configuration III, an antibacterial region 200 is disposed on a region that is likely to be touched by hand, and a non-antibacterial region 201 is disposed in a region that is unlikely to be touched by hand. Thus, the amount of antibacterial toner used is reduced while maintaining the antibacterial effect. That is, the antibacterial effect and a reduction in cost can be balanced.

<Details of Configuration IV>

FIGS. 5A to 5E illustrate configuration IV. Note that FIGS. 5A to 5E correspond to FIGS. 4A to 4E. Thus, the description in configuration III shall be referred to in regard to features in configuration IV that are the same as those in configuration III. The white arrows indicate the conveyance direction of the recording material 8. In configuration IV, the area of the antibacterial region 200 provided on the front surface P1 of the recording material 8 is equal to the area of the antibacterial region 200 provided on the back surface P2 of the recording material 8. Furthermore, the position of the antibacterial region 200 on the back surface P2 is aligned (overlaps) with the position of the antibacterial region 200 on the front surface P1.

In configuration IV, an assumption is made of a situation in which the recording material 8 is held between fingers rather than being held by hand. That is, an assumption is made that a user would view information printed on both sides of the recording material 8 while pinching the recording material 8 by hand. If the recording material 8 is of small weight or small size, a user would usually hold the recording material 8 between fingers. In such a case, the areas of the antibacterial regions 200 can be reduced while disposing the antibacterial regions 200 on both sides of the recording material 8. Thus, the antibacterial effect and a reduction in cost can be balanced.

The difference between configuration III and configuration IV is that the area of the antibacterial region 200 on the back surface P2 is equal to the area of the antibacterial region 200 on the front surface P1. The area of the recording material 8 touched by fingers differs between a case in which the recording material 8 is heavy and thus held using the entire hand and a case in which the recording material 8 is light and thus can be held between at least two fingers. That is, the area touched by fingers is large in the former case, and is small in the latter case. The widths w of the antibacterial regions 200 are designed with this in consideration.

Figure 5A:
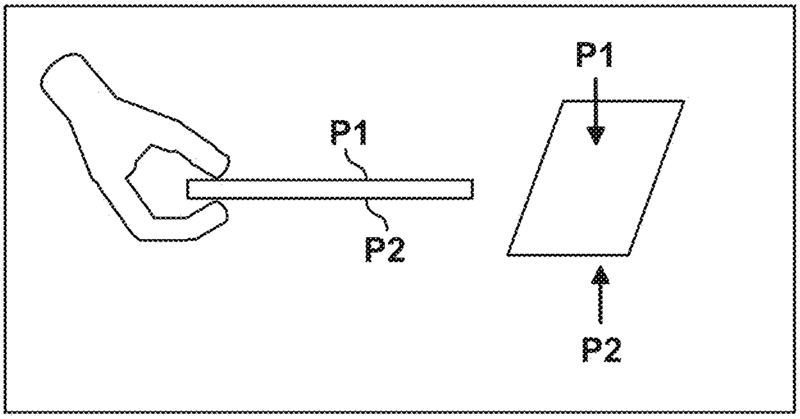
FIG. 5A is a diagram illustrating antibacterial regions relating to configuration IV.
Figure 5B:
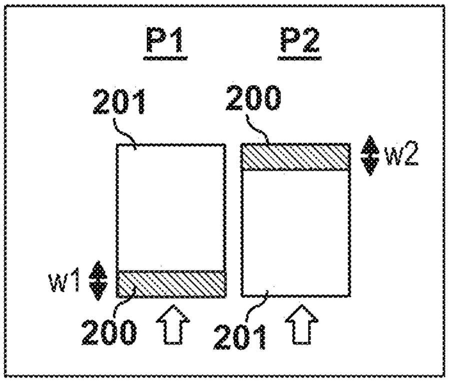
FIG. 5B is a diagram illustrating antibacterial regions relating to configuration IV.

It has been calculated that the width w1 and the width w2 of the antibacterial regions 200 are to be approximately 80 mm in a case in which the bottom edge side of the recording material 8 will be held between fingers as illustrated in FIG. 5B.

Figure 5C:
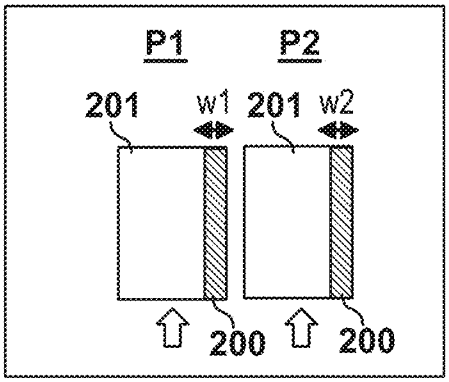
FIG. 5C is a diagram illustrating antibacterial regions relating to configuration IV.

It has been calculated that the width w1 and the width w2 of the antibacterial regions 200 are to be approximately 80 mm also in a case in which a side (right side) of the recording material 8 will be held between fingers as illustrated in FIG. 5C.

Figure 5D:
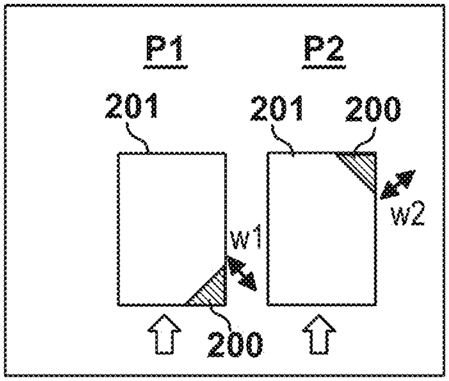
FIG. 5D is a diagram illustrating antibacterial regions relating to configuration IV.

It has been calculated that the width w1 and the width w2 of the antibacterial regions 200 are to be approximately 80 mm also in a case in which one of the four corners of the recording material 8 will be held between fingers as illustrated in FIG. 5D.

Figure 5E:
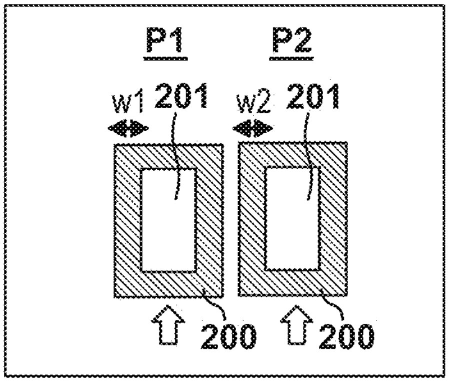
FIG. 5E is a diagram illustrating antibacterial regions relating to configuration IV.

As illustrated in FIG. 5E, in a case in which a user will hand over the recording material 8 to someone else while holding the edge portion of the recording material 8 between fingers, an antibacterial region 200 and a non-antibacterial region 201 that are the same as those on the front surface P1 are also provided on the back surface P2. It has been calculated that the width w1 and the width w2 of the antibacterial regions 200 are to be approximately 80 mm in this case.

In configuration IV, an antibacterial region 200 and a non-antibacterial region 201 are disposed on both the front surface P1 and the back surface P2 of the recording material 8. Thus, a reduction in cost is achieved compared to a case in which the antibacterial treatment is applied to the entire area of both sides. The position of the antibacterial region 200 on the front surface P1 and the position of the antibacterial region 200 on the back surface P2 match. Thus, a user can predict the position of the antibacterial region 200 on the back surface P2 from the antibacterial region 200 on the front surface P1 without looking at the back surface P2. That is, a user would be able to easily recognize which location(s) of the recording material 8 are to be held between fingers. Due to this, the versatility of the recording material 8 improves, and a reduction in cost is also achieved.

As described above, by adopting one of configurations I to IV, the antibacterial treatment is applied to a surface region that is likely to be touched by hand, and the antibacterial treatment is not applied to a surface region that is unlikely to be touched by hand. Thus, a reduction in cost is achieved while maintaining the antibacterial effect.

Advantages of Present Embodiment

FIG. 6 illustrates evaluations of configurations I to IV in relation to a comparative example. In the comparative example, an antibacterial region is disposed only over the entire area of one side of the recording material 8. In the evaluation, rating is performed in the three levels "GOOD", "NOT BAD", and "NOT GOOD". "GOOD" indicates the highest rating. "NOT BAD" indicates the second highest rating. In particular, "NOT BAD" indicates that the effect is obtained in a specific state but is unlikely to be obtained in a different state. "NOT GOOD" indicates the third highest rating. In particular, "NOT GOOD" indicates that the effect is not obtained.

As illustrated in FIG. 6, configurations I to IV are all superior to the comparative example in terms of the balance between the antibacterial effect and cost. In particular, configurations III and IV are superior to the comparative example in terms of ease of handling.

The above-described advantages can also be obtained in a case in which the recording material 8 is preprinted paper. That is, configurations I to IV are also applicable to preprinted paper already having an image printed thereon. In such a manner, a balance between antibacterial property and cost can also be achieved in regard to preprinted paper. Furthermore, ease of handling is also achieved in regard to printed materials formed from preprinted paper.

(Controller)

Figure 7:
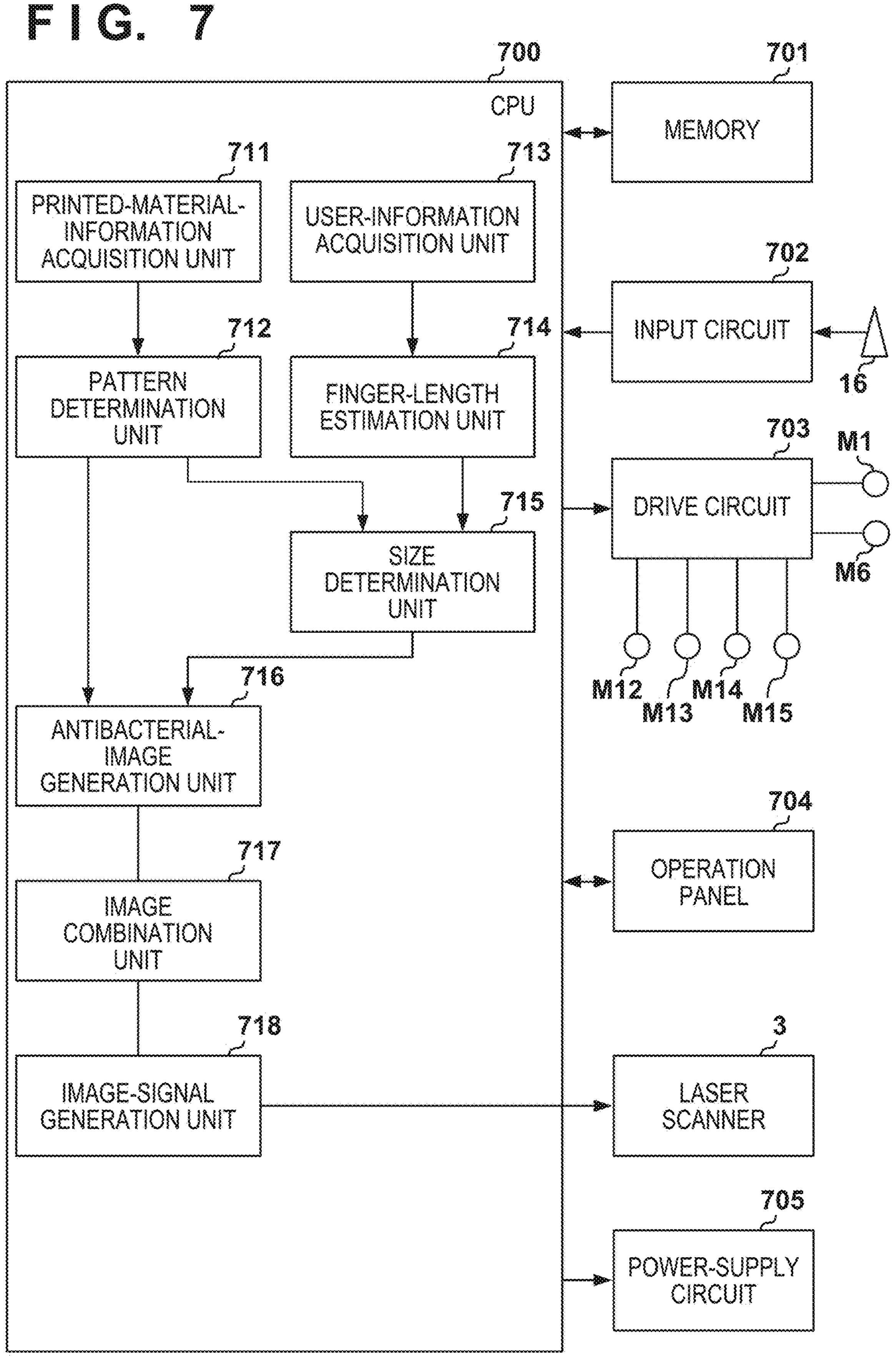
FIG. 7 is a diagram describing a controller.

FIG. 7 illustrates a controller of the image forming apparatus 100. A CPU 700 realizes a plurality of functions by executing a control program stored in a ROM area of a memory 701. Some or all of the plurality of functions may be implemented on a hardware circuit such as an application-specific integrated circuit (ASIC). Note that the memory 701 also includes a RAM area. ROM stands for read-only memory, and is a non-volatile storage device. RAM stands for random-access memory, and is a volatile storage device.

An input circuit 702 inputs sensing results of the sheet sensor 16 to the CPU 700. A drive circuit 703 drives motors M1, M6, and M12 to M15 based on instructions from the CPU 700. The motor M1 drives the photosensitive drum 1, etc. The motor M6 drives the fixing device 17. The motor M12 drives the feed roller 12. The motor M13 drives the conveyance rollers 13. The motor M14 drives the discharge rollers 14. The motor M15 drives the conveyance rollers 15.

An operation panel 704 includes a display device that displays information to a user, and an input device to which the user inputs instructions. The operation panel 704 may be realized by a touch-panel display.

A printed-material-information acquisition unit 711 acquires, from the memory 701 or the operation panel 704, printed material information relating to a recording material 8 after an image is printed thereon by the image forming apparatus 100 (printed material). For example, the printed material information includes the sheet size (e.g., A4, A3) of the recording material 8, the print direction (vertical, horizontal), the printed side (one side, both sides), the purpose of use of the printed material (e.g., staple binding, booklet, bookbinding, centerfold), etc.

A pattern determination unit 712 determines an antibacterial pattern based on the printed material information. As described above, the antibacterial pattern indicates the shape and position of one or more antibacterial regions in relation to the recording material 8. A database in which printed material information and antibacterial patterns are associated with one another may be stored in the memory 701. The pattern determination unit 712 may determine an antibacterial pattern corresponding to the printed material information by referring to the database.

A user-information acquisition unit 713 acquires user information from the memory 701 or the operation panel 704. The user information is information relating to the lengths of a user's fingers, such as the length of the thumb and the length of the index finger. For example, the user information includes a user's age, a user's gender, etc. The user information may be the lengths of a user's fingers per se. In this case, a finger-length estimation unit 714 would be unnecessary. However, the finger-length estimation unit 714 is incorporated if the lengths of other fingers are to be estimated from the length of one finger of a user (e.g., length of the thumb).

The finger-length estimation unit 714 estimates the lengths of a user's fingers based on the user information. A database in which user information and lengths of user's fingers are associated with one another may be stored in the memory 701. The finger-length estimation unit 714 may acquire the lengths of a user's fingers corresponding to the user information by referring to this database.

A size determination unit 715 determines the size of the antibacterial pattern (pattern size) based on finger length. As described above, the size determination unit 715 determines the widths w1 and w2 of antibacterial regions 200. A database in which antibacterial patterns and widths w1 and w2 are associated with one another may be stored in the memory 701. The size determination unit 715 may acquire widths w1 and w2 corresponding to the antibacterial pattern by referring to this database.

An antibacterial-image generation unit 716 generates antibacterial image data based on the sheet size, the antibacterial pattern, and the pattern size. An image combination unit 717 generates combined image data by combining the antibacterial image data with image data prepared by a user. Note that, if the recording material 8 is preprinted paper, the combined image data may be the antibacterial image data per se. As a matter of course, image data prepared by the user may also be printed on preprinted paper.

An image-signal generation unit 718 generates an image signal by applying gradation correction, dithering, etc., to the combined image data. The image signal is supplied to the laser scanner 3.

A power-supply circuit 705 is a power-supply circuit that is controlled by the CPU 700 and generates the charging voltage, the developing voltage, and a transfer voltage. The charging voltage is applied to the charging roller 2. The developing voltage is applied to the developer carrying member 6. The transfer voltage is applied to the transfer roller 7. Normally, the CPU 700 sets the charging voltage and the developing voltage such that fogging is not generated on the recording material 8. However, the CPU 700 may generate one or more antibacterial regions 200 by setting the charging voltage and the developing voltage so that fogging is deliberately generated on the recording material 8. Antibacterial patterns that can be formed in this case are the antibacterial patterns illustrated in FIGS. 2C, 2D, 4B, and 5B. That is, a rectangular pattern that extends in a direction orthogonal to the rotation direction of the photosensitive drum 1 is formed.

(Flowchart)

Figure 8:
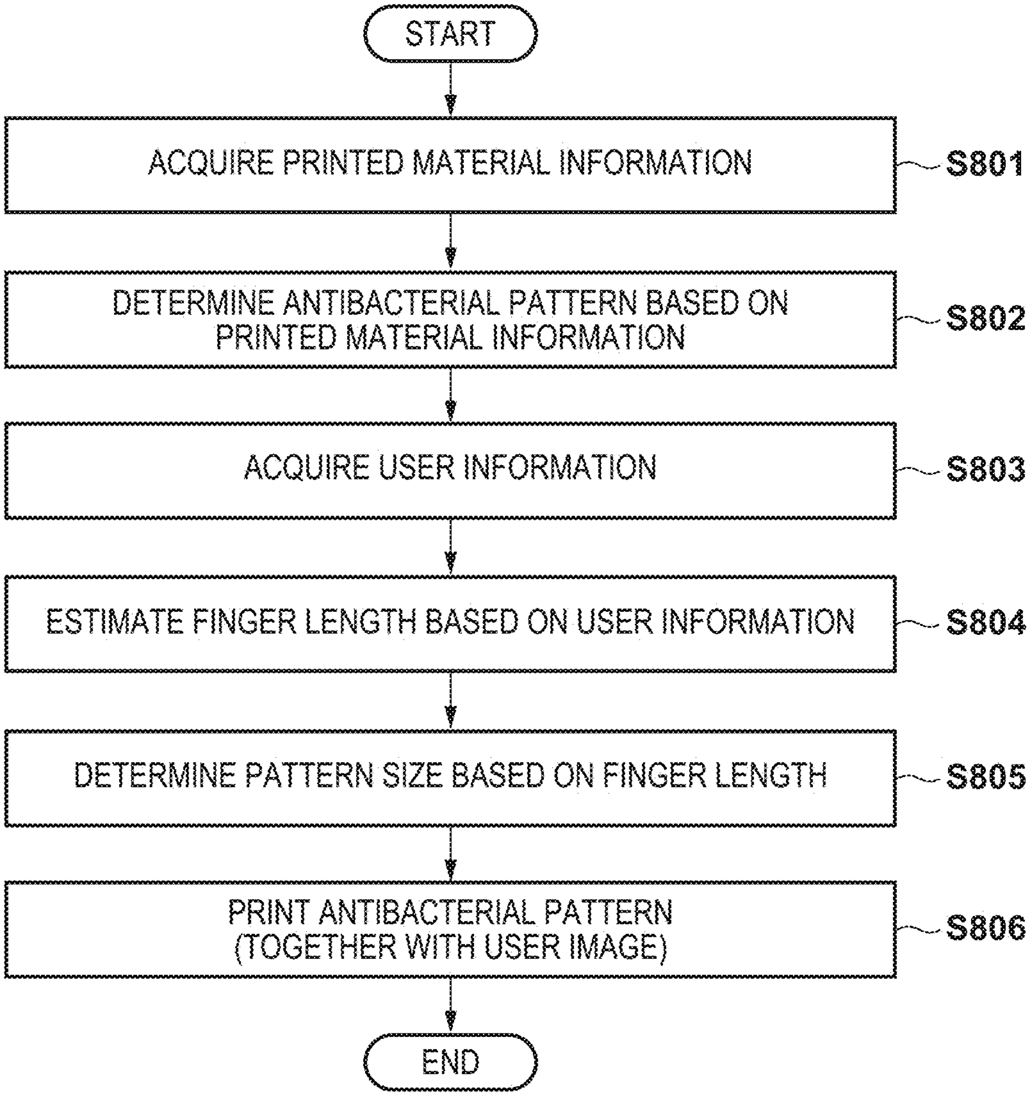
FIG. 8 is a flowchart describing an antibacterial method.

FIG. 8 illustrates processing for forming an antibacterial image that the CPU 700 executes in accordance with the control program.

In step S801, the CPU 700 acquires printed material information. As described above, the printed-material-information acquisition unit 711 acquires the printed material information from the operation panel 704 or the memory 701.

In step S802, the CPU 700 determines an antibacterial pattern based on the printed material information. The pattern determination unit 712 determines the position (e.g., bottom-edge side, right-edge side, top-edge side) and shape (e.g., rectangle, semicircle, triangle, frame shape) of one or more antibacterial regions 200 in relation to a recording material 8 based on the printed material information.

In step S803, the CPU 700 acquires user information. The user-information acquisition unit 713 acquires the user information from the memory 701 or the operation panel 704.

In step S804, the CPU 700 estimates finger length based on the user information. The finger-length estimation unit 714 acquires finger length corresponding to the user information by referring to a database stored in the memory 701. In place of a database, a mathematical formula or a program module that outputs finger length when user information is input may be adopted.

In step S805, the CPU 700 determines a pattern size based on the finger length. The size determination unit 715 acquires a pattern size of the antibacterial pattern that corresponds to the finger length by referring to a database stored in the memory 701. In place of a database, a mathematical formula or a program module that outputs a pattern size (e.g., w1, w2) when finger length is input may be adopted.

In step S806, the CPU 700 controls the image forming apparatus 100 to print an antibacterial pattern on the recording material 8 together with a user image. The user image is an image prepared by a user. The user image need not be printed in a case such as that in which the recording material 8 is preprinted paper.

<Technical Concepts Derivable from Embodiments>

[Aspect 1]

As illustrated in FIG. 1, the developing container 5 is an example of a holding container that holds a toner containing an antibacterial agent. The photosensitive drum 1, the developer carrying member 6, the transfer unit 19, etc., constitute an example of an image forming unit that forms an antibacterial region 200 by applying the toner supplied from the holding container to a recording material 8 by performing an image forming process. The antibacterial region 200 is formed on a partial region that is a partial region of a first surface of the recording material 8 and that is likely to be touched by a user's finger. Thus, an image forming apparatus 100 is provided that can balance an antibacterial effect and antibacterial cost.

[Aspect 2]

The toner may be a toner (antibacterial toner 4) that does not contain any colorant. Thus, the antibacterial toner 4 may be called a clear toner. Note that the toner may be replaced with an ink or the like containing the antibacterial agent. In other words, embodiment 1 is also applicable to an image forming apparatus of the inkjet recording method.

[Aspect 3]

As illustrated for example in FIGS. 2A to 2D, etc., the partial region of the first surface of the recording material 8 may be at least part of a surface region excluding a binding margin of the recording material 8. Because the possibility of a user touching the binding margin is low, it would be possible to omit the antibacterial toner 4 therefrom.

[Aspects 4 and 5]

Each of FIGS. 2A to 2D and FIG. 2E may be combined. The partial region of the first surface of the recording material 8 may be at least part of a surface region excluding the binding margin of the recording material and a frame region touching four edges of the recording material. Note that, for example, the binding margin is a region to which a staple, a punch hole, or glue is to be applied.

[Aspect 6]

As illustrated in FIG. 2D, the partial region of the first surface of the recording material 8 may be at least part of a surface region excluding a spine of the recording material 8. This is because it can be considered that the possibility of the spine being touched by finger is lower compared to that of other surface regions. The antibacterial toner 4 can be saved because a non-antibacterial region 201 is provided in regions that are unlikely to be touched by finger.

[Aspect 7]

As illustrated in FIG. 2E, the partial region of the first surface of the recording material 8 may be at least part of a surface region excluding a frame region touching four edges of the recording material 8. This is because the possibility is low of an edge region of a printed material accommodated in a picture frame or the like being touched by finger. The antibacterial toner 4 can be saved because the non-antibacterial region 201 is provided in a region that is unlikely to be touched by finger.

[Aspect 8]

As illustrated in FIG. 3A, the partial region of the first surface of the recording material 8 may be a frame region touching four edges of the recording material 8. Thus, an antibacterial treatment is appropriately applied to a region that is likely to be touched by finger when a printed material is passed between individuals at a government-office service counter or the like. The antibacterial toner 4 can be saved because the non-antibacterial region 201 is provided in a region that is unlikely to be touched by finger.

[Aspect 9]

As illustrated in FIGS. 3B and 3F, the partial region of the first surface of the recording material 8 may be a band-shaped region touching one or two fore edges among four edges of the recording material 8. Thus, an antibacterial treatment is appropriately applied to a region that is likely to be touched by finger when a printed material is spread open. The antibacterial toner 4 can be saved because the non-antibacterial region 201 is provided in a region that is unlikely to be touched by finger.

[Aspect 10]

As illustrated in FIGS. 3C and 3G, the partial region of the first surface of the recording material 8 may be an L-shaped or inverted L-shaped region touching two adjacent edges among four edges of the recording material 8. Thus, an antibacterial treatment can be appropriately applied to regions of a printed material accommodated in the clear file 300 or the like that is likely to be touched by finger. The antibacterial toner 4 can be saved because the non-antibacterial region 201 is provided in a region that is unlikely to be touched by finger.

[Aspect 11]

As illustrated in FIGS. 3D and 3H, the partial region of the first surface of the recording material 8 may include a surface region to be exposed from an opening provided in an accommodating object (e.g., the clear file 300) that accommodates the recording material 8. Thus, an antibacterial treatment can be appropriately applied to a region of a printed material accommodated in the clear file 300 or the like that is likely to be touched by finger via the opening 301. The antibacterial toner 4 can be saved because the non-antibacterial region 201 is provided in a region that is unlikely to be touched by finger.

[Aspect 12]

As illustrated in FIG. 3H, the accommodating object may be a folder made from paper or a resin.

[Aspect 13]

As illustrated in FIGS. 4A to 5E, the antibacterial region 200 may be formed on both the partial region of the first surface of the recording material 8 and a partial region of a second surface of the recording material 8.

[Aspect 14]

As illustrated in FIGS. 4A to 5E, the first surface may be a front surface of the recording material 8, and the second surface may be a back surface of the recording material 8.

[Aspect 15]

As illustrated in FIGS. 4A to 4E, an area of the partial region of the first surface of the recording material 8 may be smaller than an area of the partial region of the second surface of the recording material 8. In other words, the area of the partial region of the second surface of the recording material 8 may be larger than the area of the partial region of the first surface of the recording material 8. Thus, the antibacterial effect on the second-surface side can be enhanced while reducing consumption of the antibacterial toner 4 on the first-surface side.

[Aspect 16]

The antibacterial region formed on the partial region of the first surface of the recording material 8 and the antibacterial region formed on the partial region of the second surface of the recording material 8 may be edge-portion regions touching at least one same edge among four edges of the recording material 8. This is illustrated for example in FIGS. 4B to 4E, etc.

[Aspect 17]

As described in regard to FIGS. 4A to 4E, etc., the image forming unit may be configured to form images on a plurality of sheets that form a booklet (recording material 8). In this case, the partial region of the first surface of the recording material (booklet) may be a partial region of a front cover of the booklet. The partial region of the second surface of the recording material (booklet) may be a partial region of a back cover of the booklet.

[Aspect 18]

As illustrated in FIGS. 4B to 4E, etc., the partial region of the front cover of the booklet and the partial region of the back cover of the booklet may be edge-portion regions touching one same edge among four edges of the booklet.

[Aspect 19]

As illustrated in FIGS. 4B and 4C, etc., the one same edge may be a fore edge of the booklet. This is because edge-portion regions touching the fore edge are likely to be touched by a user's finger.

[Aspect 20]

As illustrated in FIG. 4D, etc., the partial region of the front cover of the booklet and the partial region of the back cover of the booklet may be edge-portion regions touching two adjacent edges among four edges of the booklet.

[Aspect 21]

As illustrated in FIG. 4D, etc., the partial region of the front cover of the booklet and the partial region of the back cover of the booklet may be triangular regions.

[Aspect 22]

As illustrated in FIG. 4E, etc., the partial region of the front cover of the booklet may be a frame region touching four edges of the front cover.

[Aspect 23]

As illustrated in FIGS. 4E, etc., the antibacterial region 200 may be formed on both the partial region of the first surface of the recording material 8 and a second surface of the recording material 8.

[Aspect 24]

The image forming unit may be configured to form images on a plurality of sheets that form a booklet (recording material 8). The partial region of the first surface of the recording material (booklet) may be a partial region of a front cover of the booklet. As illustrated in FIG. 4E, etc., the second surface of the recording material (booklet) may be a back cover of the booklet. The antibacterial region 200 formed on the back cover of the booklet may be formed over an entire surface of the back cover.

[Aspect 25]

As illustrated in FIGS. 4B to 4D, etc., an area of the antibacterial region 200 formed on the partial region of the first surface of the recording material 8 and an area of the antibacterial region 200 formed on the partial region of the second surface of the recording material 8 may be different. This is because the area of a region of the first surface that is likely to be touched by finger and the area of a region of the second surface that is likely to be touched by finger could be different.

[Aspect 26]

As illustrated in FIGS. 5B to 5E, etc., an area of the antibacterial region 200 formed on the partial region of the first surface of the recording material 8 and an area of the antibacterial region 200 formed on the partial region of the second surface of the recording material 8 may be equal.

[Aspects 27 and 28]

As illustrated in FIGS. 4B to 4D, etc., an area of the antibacterial region 200 formed on the front cover of the booklet and an area of the antibacterial region 200 formed on the back cover of the booklet may be different. The area of the antibacterial region 200 formed on the front cover of the booklet may be smaller than the area of the antibacterial region 200 formed on the back cover of the booklet. In other words, the area of the antibacterial region 200 formed on the back cover of the booklet may be larger than the area of the antibacterial region 200 formed on the front cover of the booklet. A booklet is heavier than one sheet of recording material 8. Thus, if a booklet is held by hand, many fingers are likely to touch the back surface of the booklet. Accordingly, a strong antibacterial effect would be achieved by increasing the area of the antibacterial region 200 formed on the back cover of the booklet.

[Aspect 29]

As illustrated in FIGS. 5B to 5E, etc., an area of the antibacterial region 200 formed on the front cover of the booklet and an area of the antibacterial region 200 formed on the back cover of the booklet may be equal.

[Aspects 30 and 31]

As illustrated in FIG. 7, the CPU 700 is an example of a controller that controls the image forming unit. The CPU 700 may be called a processor, a processor core, or a processor circuit. The CPU 700 may determine a position of the antibacterial region 200 in relation to the recording material 8. Alternatively, the CPU 700 may determine a shape of the antibacterial region 200 in relation to the recording material 8.

[Aspect 32]

For example, the CPU 700 may determine a size of the antibacterial region 200 based on user information (e.g., age, gender) relating to a user's physical size. Thus, for each user, the antibacterial region 200 of appropriate size would be provided.

[Aspects 33 to 35]

The CPU 700 may estimate finger length based on the user information, and determine the size of the antibacterial region 200 based on the finger length. The finger length may at least include a length of a thumb. The finger length may include at least a length of a thumb, and a length of one finger other than a thumb (e.g., index finger, middle finger, ring finger, pinky).

[Aspect 36]

The recording material 8 includes an easy-to-touch region that is likely to be touched by human hand, and a difficult-to-touch region that is unlikely to be touched by human hand. The antibacterial region 200 is disposed on the easy-to-touch region, and need not be disposed on the difficult-to-touch region.

[Aspects 37 and 38]

The antibacterial region 200 may include a rectangular region that is parallel to one of four edges of the recording material 8. A short-edge-direction length of the rectangular region may be no less than 60 mm and no more than 100 mm. The short-edge-direction length of the rectangular region may be no less than 80 mm and no more than 100 mm.

[Aspect 39]

The laser scanner 3, the developer carrying member 6, etc., may form the antibacterial region 200 to have a density such that the antibacterial region 200 is difficult to see with human eyes. Thus, the antibacterial region 200 would not interfere with a user-prepared image.

[Aspect 40]

The charging roller 2 is an example of a charging member to which a charging voltage is applied, the charging member charging the photosensitive drum 1. The laser scanner 3 is an example of an exposure light source that forms an electrostatic latent image by exposing the photosensitive drum 1 to light. The developer carrying member 6 is an example of a developing member to which a developing voltage is applied, the developing member forming a toner image by developing the electrostatic latent image using the antibacterial toner 4. The power-supply circuit 705 is an example of a power supply that generates the charging voltage and the developing voltage. The CPU 700 functions as a controller that controls the power supply and the exposure light source. The CPU 700 may control the charging voltage and the developing voltage such that the antibacterial region 200 is generated in the form of fogging. In doing so, the laser scanner 3 is not turned on. Furthermore, no image signal is input to the laser scanner 3. Accordingly, power consumption is reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:

a holding container that holds a toner containing an antibacterial agent; and an image forming unit that forms an antibacterial region by applying the toner supplied from the holding container to a recording material by performing an image forming process, wherein the antibacterial region is formed on a partial region that is a partial region of a first surface of the recording material and that is likely to be touched by a user's finger.

2. The image forming apparatus according to claim 1, wherein the toner containing the antibacterial agent is a toner that does not contain any colorant.

3. The image forming apparatus according to claim 1, wherein the partial region of the first surface of the recording material is at least part of a surface region excluding a binding margin of the recording material.

4. The image forming apparatus according to claim 1, wherein the partial region of the first surface of the recording material is at least part of a surface region excluding a binding margin of the recording material and a frame region touching four edges of the recording material.

5. The image forming apparatus according to claim 3, wherein the binding margin is a region to which a staple, a punch hole, or glue is to be applied.

6. The image forming apparatus according to claim 1, wherein the partial region of the first surface of the recording material is at least part of a surface region excluding a spine of the recording material.

7. The image forming apparatus according to claim 1, wherein the partial region of the first surface of the recording material is at least part of a surface region excluding a frame region touching four edges of the recording material.

8. The image forming apparatus according to claim 1, wherein the partial region of the first surface of the recording material is a frame region touching four edges of the recording material.

9. The image forming apparatus according to claim 1, wherein the partial region of the first surface of the recording material is a band-shaped region touching a fore edge among four edges of the recording material.

10. The image forming apparatus according to claim 1, wherein the partial region of the first surface of the recording material is an L-shaped or inverted-L-shaped region touching two adjacent edges among four edges of the recording material.

11. The image forming apparatus according to claim 1, wherein the partial region of the first surface of the recording material includes a surface region to be exposed from an opening provided in an accommodating object that accommodates the recording material.

12. The image forming apparatus according to claim 11, wherein the accommodating object is a folder made from paper or a resin.

13. The image forming apparatus according to claim 1, wherein the antibacterial region is formed on both the partial region of the first surface of the recording material and a partial region of a second surface of the recording material.

14. The image forming apparatus according to claim 13, wherein the first surface is a front surface of the recording material, and the second surface is a back surface of the recording material.

15. The image forming apparatus according to claim 13, wherein an area of the partial region of the first surface of the recording material is smaller than an area of the partial region of the second surface of the recording material.

16. The image forming apparatus according to claim 13, wherein the antibacterial region formed on the partial region of the first surface of the recording material and the antibacterial region formed on the partial region of the second surface of the recording material are edge-portion regions touching at least one same edge among four edges of the recording material.

17. The image forming apparatus according to claim 13, wherein the recording material is a booklet formed from a plurality of sheets, the partial region of the first surface of the recording material is a partial region of a front cover of the booklet, and the partial region of the second surface of the recording material is a partial region of a back cover of the booklet.

18. The image forming apparatus according to claim 17, wherein the partial region of the front cover of the booklet and the partial region of the back cover of the booklet are edge-portion regions touching one same edge among four edges of the booklet.

19. The image forming apparatus according to claim 18, wherein the one same edge is a fore edge of the booklet.

20. The image forming apparatus according to claim 17, wherein the partial region of the front cover of the booklet and the partial region of the back cover of the booklet are edge-portion regions touching two adjacent edges among four edges of the booklet.

* * * * *